Aug. 23, 1966    R. K. FORD ETAL    3,267,939
RETAINING AND REPLACEMENT MEANS FOR DATA-STORAGE ELEMENTS
Filed July 11, 1962                          6 Sheets-Sheet 1
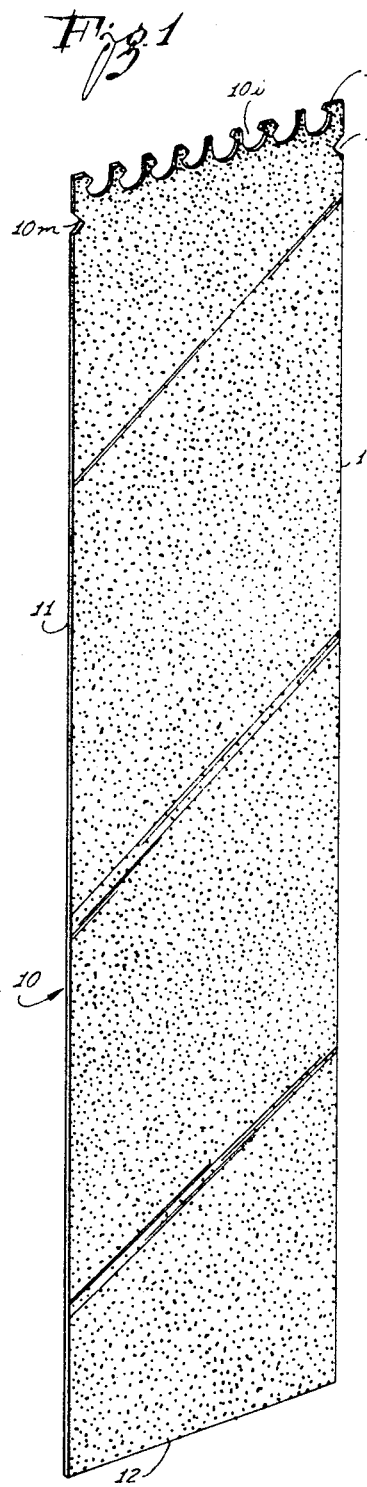
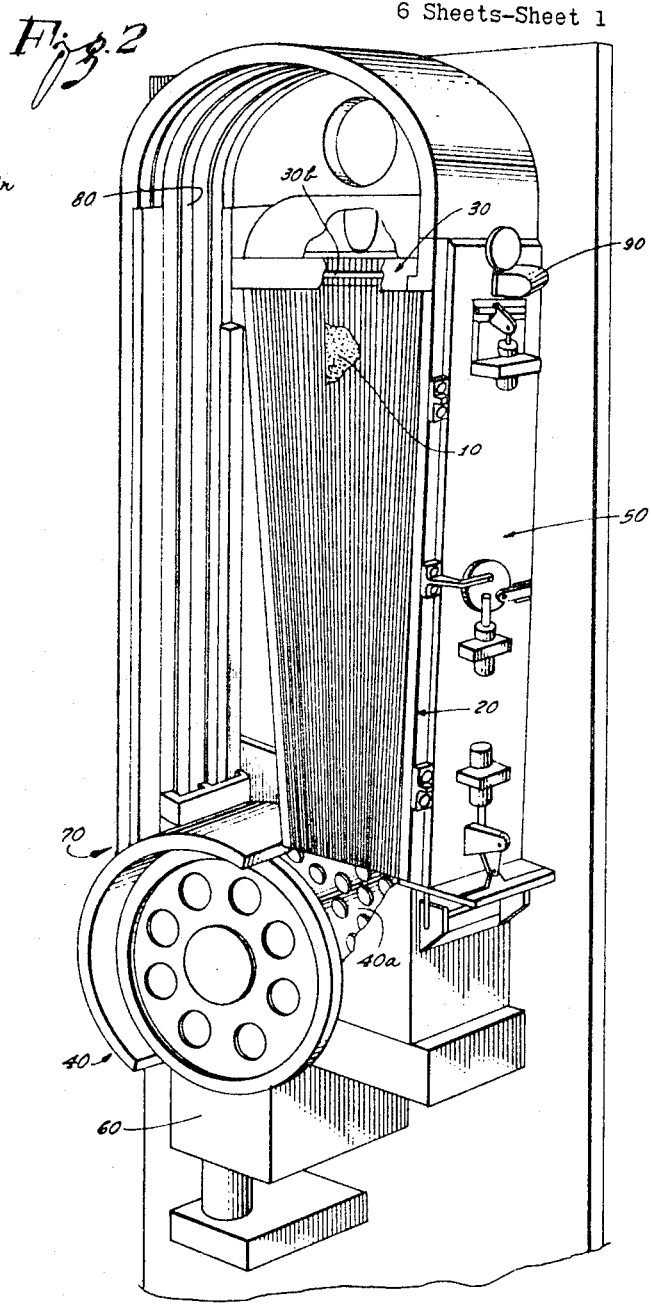
INVENTORS
Ronald K. Ford
Louis W. Thies, Jr.
Their Attorneys

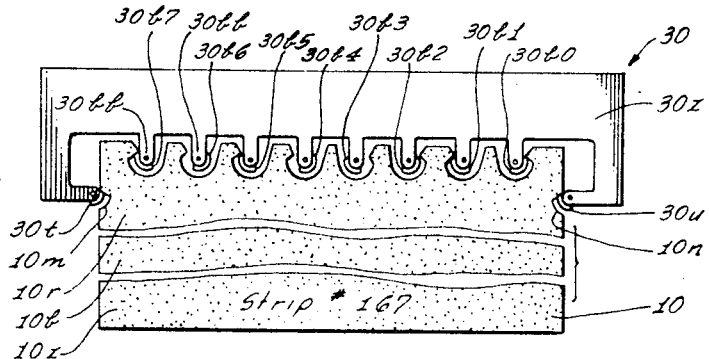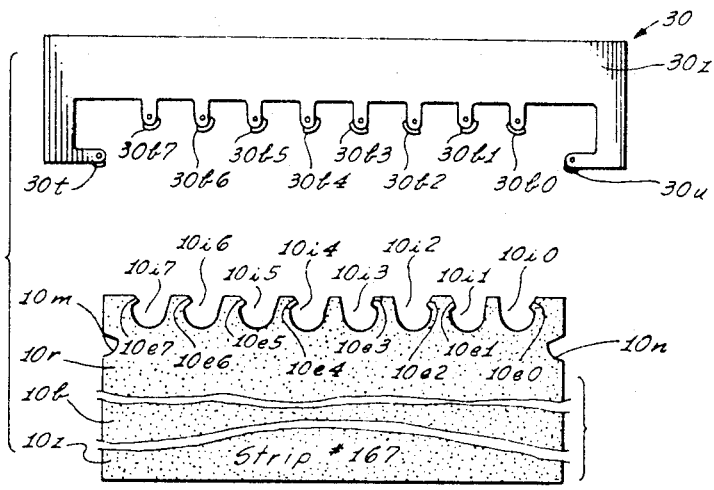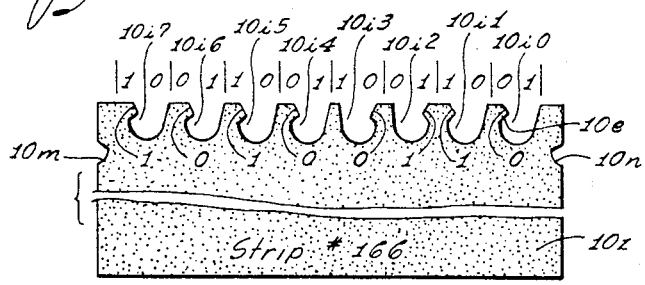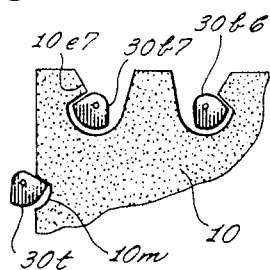

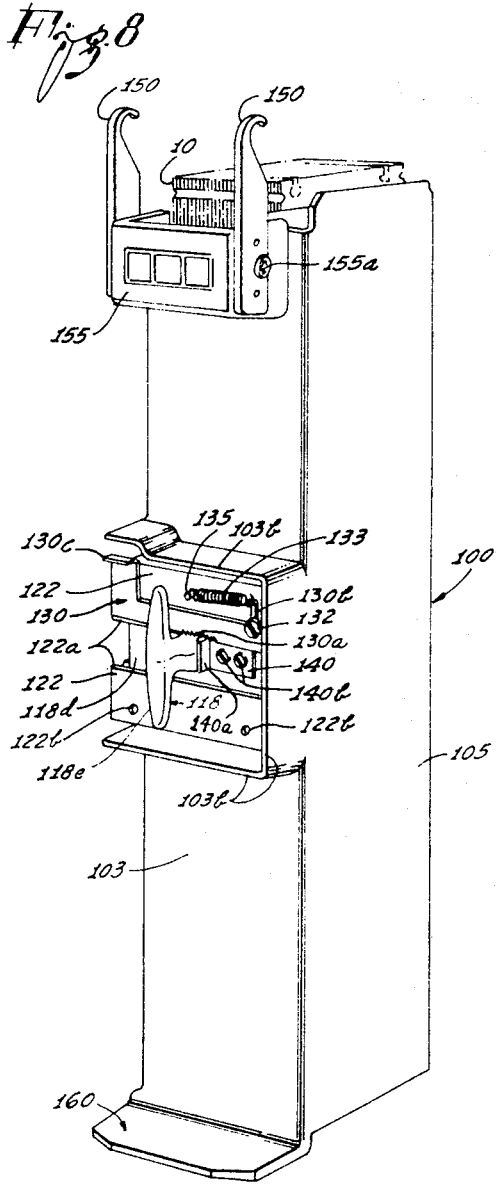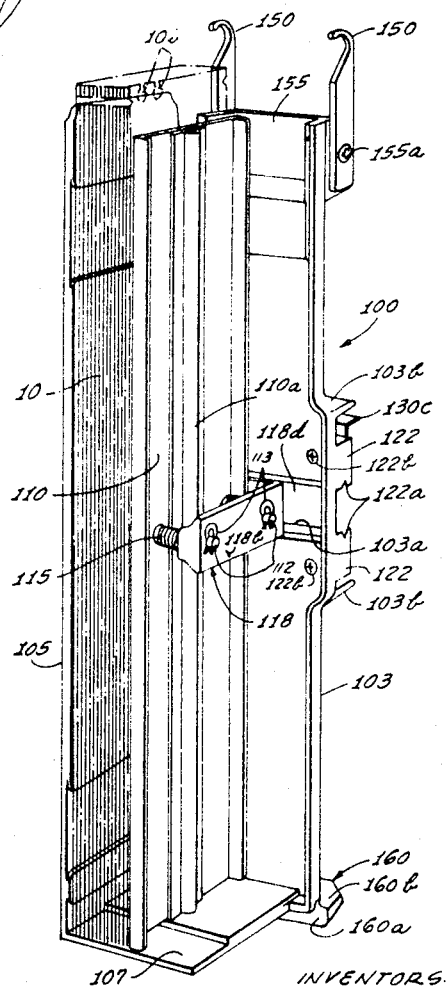

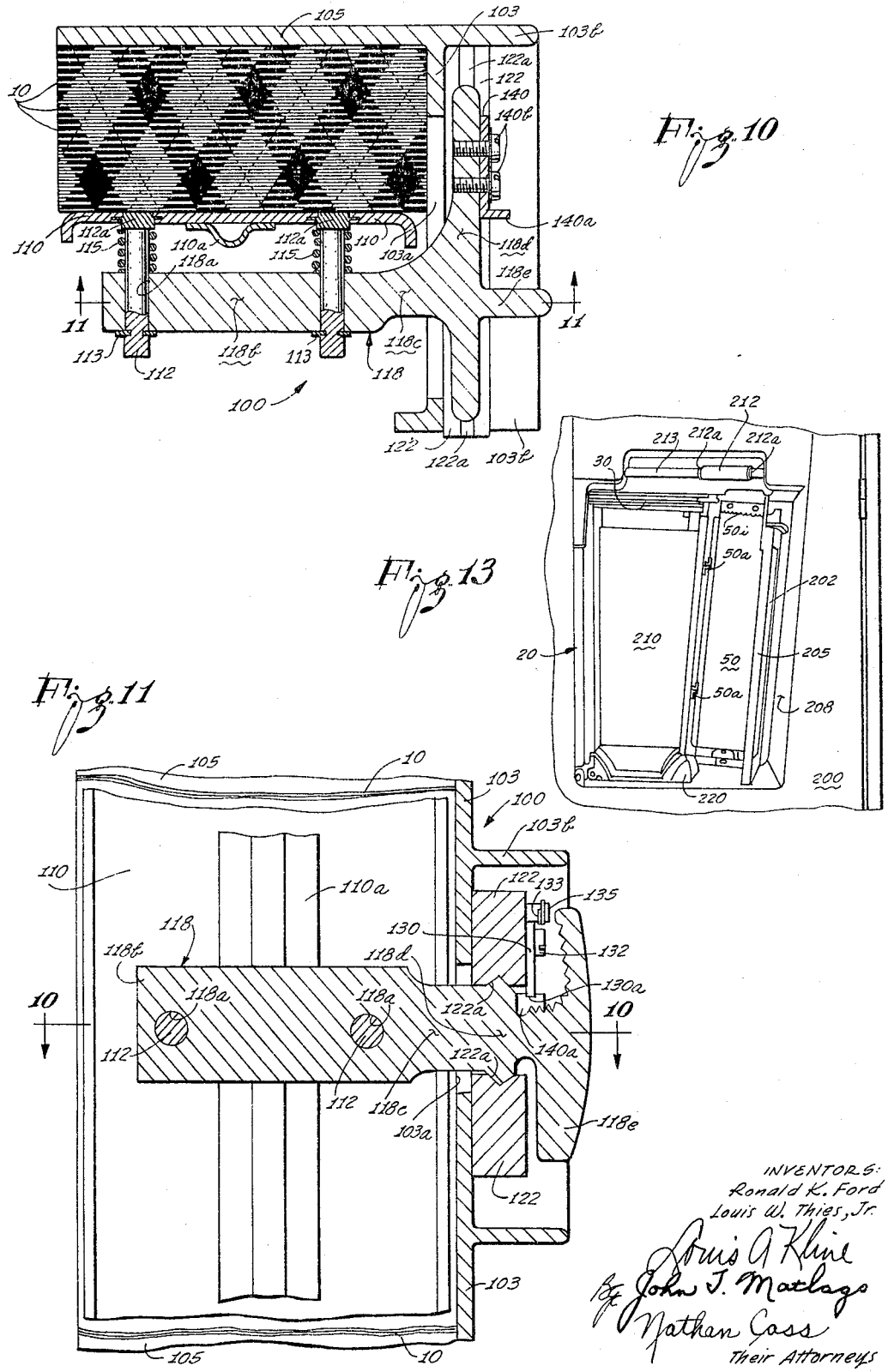

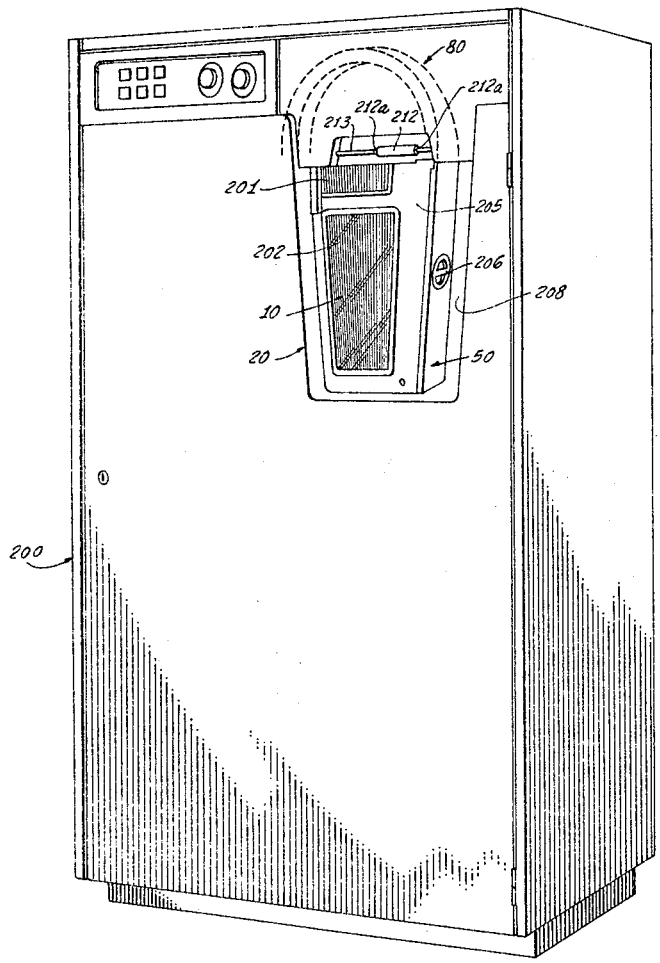

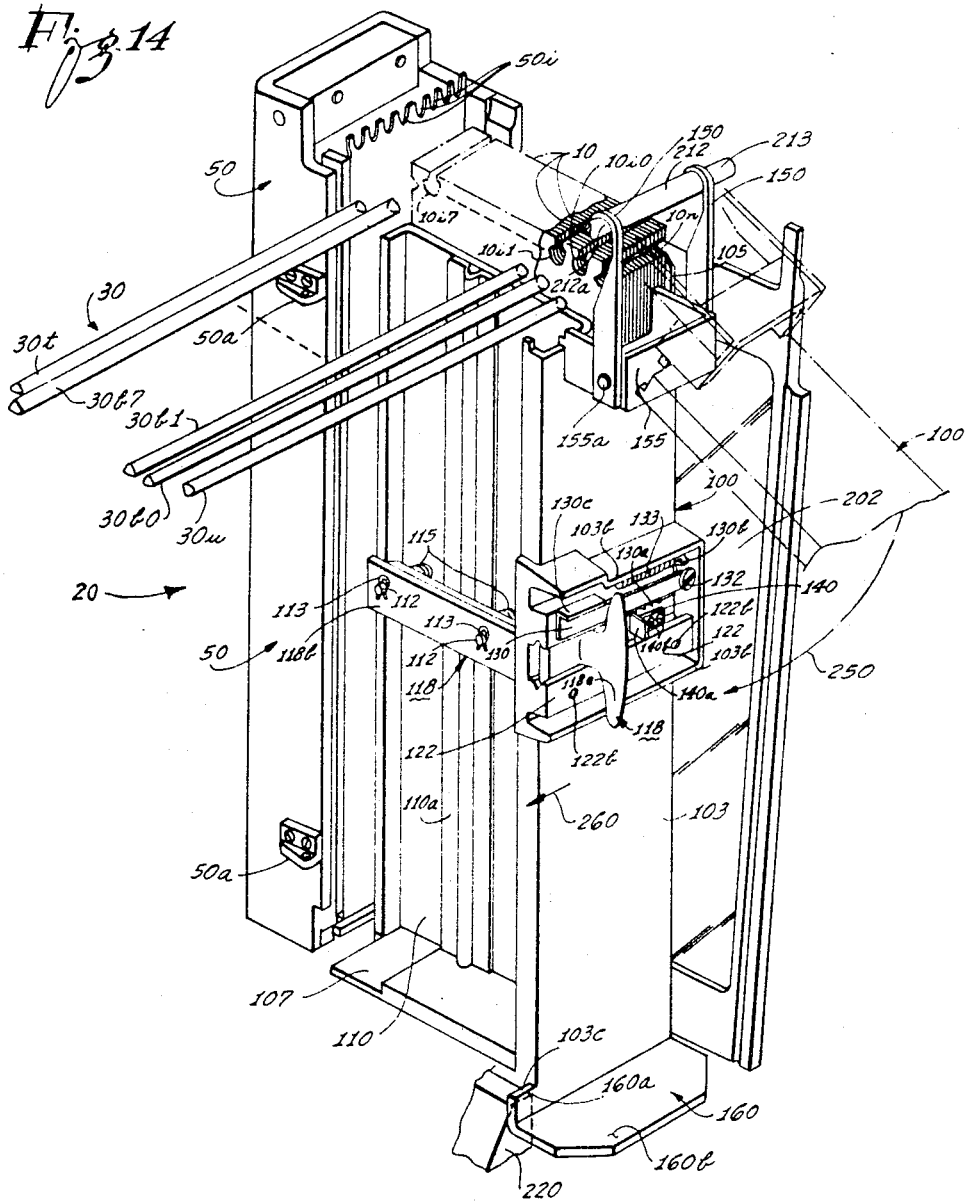

United States Patent Office 3,267,939
Patented August 23, 1966

3,267,939
RETAINING AND REPLACEMENT MEANS FOR DATA-STORAGE ELEMENTS
Ronald K. Ford, Orange, and Louis W. Thies, Jr., Palos Verdes Estates, Calif., assignors to The National Cash Register Company, Dayton, Ohio, a corporation of Maryland
Filed July 11, 1962, Ser. No. 209,121
2 Claims. (Cl. 129—28)

This invention relates generally to data-storage apparatus, and to novel means and methods for storing, inserting, removing and/or replacing the data-storage elements used therewith. More particularly, the invention relates to novel means and methods for interchanging sets of data-storage strips of the type employed with random access storage devices, such as disclosed in the commonly assigned copending application Serial No. 12,032, filed March 1, 1960, and in the Proceedings of the Eastern Joint Computer Conference, Washington, D.C., December 12–14, 1961, pages 147–157.

The advantages to be derived from a high capacity, rapidly accessible random access storage device for use in a computer system are so numerous and well recognized as to require little elaboration. However, one of the more difficult problems which has been encountered in such random access data-storage devices resides in the difficulty in providing for the rapid interchangeability of the data-storage elements employed therewith since, by their very nature, these random access devices are ordinarily constructed and arranged in a manner which does not facilitate interchangeability between data-storage elements. As a result, in many random access devices, it is necessary to provide sufficient built-in storage capacity for the maximum amount of data which might be required to be stored, thereby greatly increasing the size as well as the expense of the resultant device, while still providing only a limited capacity.

In accordance with the present invention, a most advantageous solution to this problem has been devised which will be illustrated for the particular type of random access data-storage device disclosed in the aforementioned application and publication. By means of the present invention, it becomes possible to interchange the entire set of data-storage strips employed therewith in less than half a minute. The random access device is thus given rapid and convenient access to an unlimited amount of data, since a set of data-storage strips in the device may be rapidly replaced by any other set, as desired, without destroying any data which may be stored therein.

Accordingly, it is the broad object of the present invention to provide improved means and methods for storing, inserting, removing and/or replacing the data-storage elements employed with a data-storage device.

A more specific object of the present invention is to provide a novel canister for retaining therein a set of data-storage strips of the type disclosed in the random access device of the aforementioned copending application and publication, said canister being able to retain the set of strips in protective fashion when apart from the random access device, while facilitating the insertion, removal and/or replacement of the set of strips from the random access device when desired.

Another object of the invention is to provide a canister for retaining a set of data-storage strips therein, while being able to compensate for variations in the overall thickness among different sets of strips.

A further object of this invention is to provide a canister in accordance with any or all of the preceding objects, which is also capable of aiding in the alignment of the strips into the random access device during insertion of a new set of strips.

Still another object of the invention is to provide a construction and arrangement for the portion of the random access device into which a set of data-storage strips is inserted so that interchangeability between sets is facilitated without interfering with the random access capability of the overall device.

The specific nature of the present invention as well as other objects, uses and advantages thereof will become apparent from the following description of a typical embodiment of the invention illustrated in the accompanying drawings in which:

FIG. 1 is a perspective view of a typical magnetic data-storage strip which may be employed with the present invention.

FIG. 2 is a perspective view of a basic random access data-storage device with which the present invention may be used.

FIG. 3 is a view showing typical selector and suspender rods which may be provided in the random access device of FIG. 2 for controlling the selection and release of data-storage strips, such as illustrated in FIG. 1.

FIG. 4 is a fragmentary view of FIG. 3.

FIG. 5 is a view indicating the relative dispositions of the data-storage strip and the selector and suspender rods shortly following the selection and release of a strip.

FIG. 6 is a view of the data-storage strip of FIG. 1, with a part broken away, illustrating in detail the manner in which individual strips are coded.

FIG. 7 is a partial binary truth table indicating the coding scheme employed for a set of data-storage strips.

FIG. 8 is a front perspective view of a typical embodiment of a data-storage strip canister in accordance with the invention for use in retaining a set of data-storage elements therein, and for facilitating insertion, removal and/or replacement of the set into the random access device of FIG. 2.

FIG. 9 is a rear perspective view of the canister of FIG. 8.

FIGS. 10 and 11 are respectively top and side partial cross-sectional views of the data-storage strip canister of FIGS. 8 and 9 taken along the indicated lines 11—11 and 10—10 in FIGS. 10 and 11, respectively.

FIG. 12 is a front perspective view showing the basic random access device of FIG. 2 enclosed in an appropriate cabinet.

FIG. 13 is a partial perspective view of FIG. 12 in the vicinity of the cabinet door, the door being shown open to illustrate the magazine wherein a set of data-storage strips may be contained in the random access device, the magazine being shown empty in FIG. 13.

FIG. 14 is a fragmentary perspective view of the interior of the magazine of the random access device illustrating how the data-storage strip canister of FIGS. 8 and 9 cooperates with corresponding portions of the random access device to facilitate the insertion or removal of a set of data-storage strips.

Like numerals designate like elements throughout the figures of the drawings.

Before proceeding with a detailed description of the present invention, the basic random access storage device disclosed in the aforementioned copending patent application and publication will first be described with reference to FIGS. 1–6 in order to provide a background for the description of the present invention to follow.

Referring first to FIG. 1, there is shown an embodiment of a single data-storage strip 10, such as employed in the random access data-storage device of the aforementioned application and publication. It will be seen that the strip 10 is in the form of an elongated flexible rectangular sheet having parallel side edges 11, bottom edge 12, and top edge 13 in which are placed a plurality of specifically formed indentations or notches generally denoted 10*i* for purposes which will be described later.

Referring next to FIG. 2, a plurality of data-storage strips 10 (such as shown in FIG. 1) are suspended in a magazine represented generally by the ordinal 20. Suspension, selection and release of the strips are provided by selecting and releasing means indicated generally by ordinal 30. These means 30 comprise a plurality of rods typically illustrated at 30*b* which are constructed and arranged to support a large number of strips 10 and to be operable to select and release any desired one of the strips irrespective of its position in the magazine. The strips 10 are assigned respective binary code numbers corresponding to the binary number represented by the particular arrangement of the notches 10*i* (FIG. 1), and it is these notches 10*i* which cooperate with respective rods 30*b* to release desired strips at the proper times, as will be described hereinafter. A released strip drops gravitationally into an operating means indicated generally at 40, and into a position in which its lower end portion engages the periphery of a perforated drum or capstan 40*a* comprised in operating means 40. Appropriate portions or arcs of the path of the peripheral inner surface of the capstan 40*a* are, during appropriate intervals of time, pneumatically connected to suction means for provision of a pressure differential between the exterior and interior of the capstan whereby the strip is forcibly held in contact with and is moved by the capstan. During operation of the apparatus, the capstan is continuously rotated at a suitable speed by driving means such as an electric motor, whereby the engaged strip is very rapidly driven or transported through the transducing region in which the magnetic transducer means indicated generally at 60, are situated. Application of the pressure differential or suction during appropriate intervals and over only certain limited arcs of the peripheral path of the capstan permits the strip to follow a course or path only parts of which are coincident with the surface of the capstan, whereby good contact with transducing means may be secured, and whereby the strip is permitted to be guided away from the capstan for return to the magazine.

Electrically controlled and operated switch or gate means indicated generally at 70 are provided to permit, alternatively, the aforementioned immediate return of the strip to the magazine, or one or more additional passes of the strip past the transducer means. The gate, when open, allows the lower or leading end of the strip to enter a raceway formed as part of guide means indicated generally at 80 and extending upwardly and over the magazine 20. When closed, the gate forces the moving strip to follow a path in which the strip is again drawn by suction into contact with the surface of the capstan and thereby brought around and again passed through the transducing zone. For proper operation of the strip-transport means the diameter of the capstan is such as to provide a circumference of sufficient length to preclude overlap of the leading and trailing ends of a strip when the latter is being repassed through the transducing zone.

As previously indicated, when operations with a strip by the operating means comprising transport means 40 and transducer means 60 have been completed, and the switch or gate means 70 are open, the strip is propelled upwardly along the guideway in guide means 80 and the strip proceeds by its momentum along the inner surface of the curved upper portion of the guideway, and downwardly past a photoelectric detector means indicated by ordinal 90, into a loading means indicated generally at 50. The loading means serves to arrest the strip in proper position for loading onto the suspension means, and to thereafter force the returned strip onto the suspension and releasing devices in means 30. The detector means 90, which preferably comprises photoelectric detecting means, senses arrival of the leading end of the returning strip and initiates certain loading-means operations, and later senses passage of the trailing (upper) end of the strip and initiates other operations of the apparatus. It will be understood, that following release of a strip, the strip selecting and releasing means 30 may be temporarily rendered inoperative for releasing another strip, and maintained in this inoperative status until the dropped strip is removed from the lower (operating) end of the apparatus. The strip selecting and releasing means 30 include pneumatic means for intermittently supplying and directing narrow streams or currents of air downwardly upon and between portions of the suspended strips 10 during appropriate time intervals, for the purpose of keeping the strips separated so any selected and released strip will readily descend into the operating means without appreciable interference by the other strips.

With the foregoing description of the principle functions of the basic random access data-storage device disclosed in the aforementioned patent application and publication in view, a more detailed description will now be presented of the manner in which a data-storage strip may be selectively released by strip selecting and releasing means 30.

As indicated in FIGS. 1 and 3-6, the strips 10 are each provided with a pair of opposed indentations or notches 10*m*, 10*n* disposed at respective upper side edges 11. The upper inclined edges provided by these notches 10*m*, 10*n* cooperate with complementary supporting surfaces of respective ones of a pair of rotatable suspender rods 30*t*, 30*u* as shown in FIGS. 3-5. The suspender rods 30*t*, 30*u* are formed of sector-shaped cross-section as best shown in FIG. 4, and are mounted for rotation about the axes of the sectors in a frame 30*z* formed as part of strip selecting and releasing means 30. The two suspender rods 30*t*, 30*u* are constructed and arranged for opposite concurrent rotation outwardly from the strips, and inwardly into supportive engagement with the strips.

As indicated in FIGS. 3 and 5, each of the strips 10 comprises a lower end portion 10*z* (hereinafter termed the leading end), a middle or body portion 10*b* and an upper end portion 10*r* in which the supporting notches 10*m*, 10*n*, are located. In the upper marginal edge of each of the strips there is formed a plurality of undercut indentations or notches generally denoted 10*i* and exemplified by notch 10*i*0, and of which indentations there are eight in the exemplary form; and each individual strip has a unique set of retainer lugs or ears generally denoted 10*e* (such as ear 10*e*7, for example) formed integral therewith and disposed at one or the other (left or right) side of a respective one of the notches 10*i* in dependence upon a binary code notation to be described.

The retainer lugs or ears 10*e* in each strip 10 are adapted for cooperation with respective ones of a set of eight rotatable selector rods 30*b* (such as 30*b*7 for example) which are basically similar to the suspender rods 30*t*, 30*u* in shape, construction and mounting. The selector rods 30*b* are adapted to be rotated into and out of engagement with retainer ears 10*e* of the strips for selective release of individual ones of the strips as presently will be explained. Each of the selector rods 30*b* is individually operable.

The system employed to permit selection of any individual strip 10 by operation of a respective set of selector rods 30*b* is illustrated in FIGS. 4-7. In accord with principles of the binary system of numbers employed in the code designation of strips whereby control of releasing of the strips may be easily effected by a digital data-processor, each of the strips is provided with as many upper-margin notches 10*i* or indentations as there are binary orders in the code numbers used; occurrence of a binary "1" in a code number is represented by a retainer ear 10*e* in a particular position in the corresponding indentation 10*i* of the strip bearing that code number. In the illustrative or exemplary apparatus there are two hundred and fifty-six strips in each set or pack (magazine-full); hence, as indicated in FIG. 5, there are eight upper-margin notches 10*i*0, 10*i*1 . . . 10*i*7, each corresponding to a respective binary order $2^0, 2^1, 2^2, \ldots 2^7$. Each marginal notch 10$i$ has two sides, left and right, and it is evident that either of the sides may be selected to represent the binary value "1" and the other side the value "0." For securing more uniform retention and suspension of the strips, the binary value "1" is assigned to the right side of each of the alternate notches 10$i$0, 10$i$2, 10$i$4, and 10$i$6, and to the left side of each of the other notches; and the binary value "0" is assigned to the sides opposite those assigned the value "1," all as indicated above for exemplary strip No. 166 in FIG. 6. With the described arrangement, the binary numbers corresponding to respective decimal numbers 1 through 255 may be represented by respective configurations or dispositions of retainer ears 10$e$ in the upper marginal notches 10$i$. Thus, in FIG. 6, the retainer ear configuration for binary number 10100110, corresponding to decimal number 166, is shown as it occurs on the strip of that designation. It is evident, therefore, that to select strip No. 166, selector rods 30$b$ in each of notches 10$i$0, 10$i$3, 10$i$4, and 10$i$6 must be in or rotated to "0" attitude or position, and the other selector rods similarly be in or rotated to "1" position. The configuration of retainer ears 10$e$ for any of the set of strips is readily derived from an ordinary "truth table" which lists all the possible combination of binary digits in representations of any specified number of binary positions. For example, a truth table for the eight binary positions required in the strip-coding in the exemplary apparatus, is depicted in fragmentary form in FIG. 7. Therein the code designations for the first four strips, the last three strips, and the aforedescribed exemplary strip No. 166 are indicated.

As indicated in FIG. 3, a typical strip 10 is shown suspended by suspender rods 30$t$, 30$u$, and retained by engagement of selector rods 30$b$ engaging respective retainer ears 30$e$. By reference to FIGS. 5 and 6, it is evident that the ear-configuration corresponds to binary number 10100111, or decimal number 167, and hence the strip is identified as strip No. 167. Thus, it is evident that when strip No. 167 is to be selected, selector rods 10$i$0, 10$i$1, 10$i$2, 10$i$5, and 10$i$7 must be rocked or rotated from the "1" position in which they are shown in FIG. 3 to the "0" position, while rods 10$i$3, 10$i$4, and 10$i$6 must be left in "1" position. For the selection of this exemplary strip, therefore, activating current signals will be supplied to the respective actuators for the particular selector rods 30$b$ to be moved, and no current signals will be supplied to the other selector rod actuators. Following operation of the required set of selector rods 30$b$ in response to receipt of the respective set of signals from a processor-operated controller, the selected strip will fall slightly so as to rest on the two suspender rods 30$t$, 30$u$ which are then rocked outwardly to permit the selected strip to drop under the influence of gravity. It is evident that during the interval in which the suspender rods 30$t$, 30$u$ are rocked outwardly, all other strips excepting the selected strip will remain suspended from the selector rods 30$b$.

Having described the basic random access storage device disclosed in the aforementioned copending patent application Serial No. 12,032, and the nature of the data-storage strips 10 employed therewith, it will now be expedient to consider a specific embodiment of the present invention in connection with FIGS. 8–14.

Reference will first be had to FIGS. 8, 9, 10 and 11, which respectively show front and rear perspective views, and top and side cross-sectional views of a preferred embodiment of a data-storage strip canister 100 which may advantageously be used for retaining a set of data-storage strips 10 (each as shown in FIG. 1) when apart from the basic random access storage device, while also serving to facilitate the insertion or removal of the set of strips 10 from the random access storage device when desired. It will be seen that the body portion of the canister 100 is basically comprised of integral walls 103 and 105 disposed at right angles to one another, and an integral bottom plate 107 disposed at right angles to walls 103 and 105. As best shown in FIGS. 9 and 10, a set of strips 10 is retained in the canister 100 with the face of the outermost strip at one side of the set abutting wall 105, the long edges at one side of the set of strips abutting wall 103, the bottom edges of the strips resting on bottom plate 107, and the face of the outermost strip at the opposite side of the set abutting against a buck plate 110, the top edges and the other long side edges of the set of strips being exposed. The buck plate 110 includes a strengthening brace 110$a$ and is normally urged against the set of strips to hold them tightly in place in the canister 100. The length of the walls 103 and 105 and the buck plate 110 is at least sufficiently less than the length of the strips 10 so as to permit the notches 10$i$ therein to be exposed for insertion into the selection rods of the random access device, as will hereinafter be described.

First, however, it will be described how the buck plate 110 is normally urged against the set of strips 10 and how it may conveniently and rapidly be loosened therefrom when it is desired to either remove the set of strips from the canister 100, or to insert a new set of strips into the canister 100. Referring particularly to the top cross-sectional view of FIG. 10 along with the rear perspective view of FIG. 9, it will be seen that the head portions 112$a$ of studs 112 are rigidly affixed to the central portion of buck plate 110 and extend perpendicularly outward therefrom passing through coil springs 115, holes 118$a$ in a control bracket 118, and lock washers 113, in that order, as best shown in the top view of FIG. 10. It will be understood therefore, that control bracket 118 is effectively coupled to buck plate 110 through springs 115. The purpose of this spring coupling between control bracket 118 and buck plate 110 is to facilitate locking the buck plate 110 tightly into position against the strips 10, as will be explained in more detail hereinafter.

Still referring to FIGS. 8–11, the details of the control bracket 118 will now be considered. It will be seen that the control bracket 118 is made up of the following integral portions: (1) a depending portion 118$b$ (FIGS. 9–11) which contains the holes 118$a$ through which the studs 112 are passed, (2) a neck portion 118$c$ (FIGS. 9–11) which passes through a slot 103$a$ in wall 103, (3) a transverse portion 118$d$ whose edges are slidable in grooves 122$a$ of guide rails 122, which guide rails 122 are affixed by retaining screws, such as 122$b$, to wall 103 within protective ridges 103$b$ provided integral with wall 103, and (4) a flange portion 118$e$ (FIGS. 8, 10 and 11) depending perpendicularly from transverse portion 118$d$ and capable of being operated by the fingers of a human operator so as to permit sliding the control bracket 118 back and forth in grooves 122$a$ of guide rails 122 during insertion or removal of a set of strips 10 from the canister 100. Since the buck plate 110 is coupled to the control bracket 118 by way of springs 115 and studs 112 (as described previously) it will be understood that the buck plate 110 will move accordingly along with bracket 118.

It will now be described how, during insertion of a set of strips 10 into the canister 100, the control bracket 118 may be locked into place in a position such that the buck plate 110 (which moves in accordance therewith) bears tightly against the set of strips 10 so as to firmly retain the strips in the canister 100; it will also be described how the control bracket 118 may then be subsequently unlocked when it is desired to remove the set of strips from the canister 100.

Referring to FIG. 8, it will be understood that a locking lever 130 having a ratchet 130$a$ is rotatably mounted at the right end thereof (as seen in FIG. 8) about pivot screw 132 affixed to the extreme right end of upper guide rail 122. The locking lever 130 is normally biased downwardly by the action of a spring 133 connected between a pin 135 (affixed near the center of upper guide rail 122) and a narrow portion 130$b$ projecting from the right end of locking lever 130 and integral therewith. The ratchet 130a of locking lever 130 is adapted to cooperate with a tooth 140a depending perpendicularly from engaging member 140, which is in turn affixed to the transverse portion 118d of the control bracket 118 by screws 140b (see also FIGS. 10 and 11). The cooperation between the ratchet 130a and tooth 140a is such that when the ratchet 130a is in engagement with tooth 140a as a result of the bias provided by spring 133, the control bracket 118 can be slid on guide rails 122 only towards wall 105 (that is, to the right in FIG. 8), and not in the reverse direction. Movement of the control bracket 118 in the reverse direction is possible only by lifting ratchet 130a clear of tooth 140a, which may conveniently be accomplished by lifting flange 130c, which is provided on locking lever 130 for this purpose.

In view of the foregoing, it will be understood that a set of strips 10 may be conveniently and rapidly inserted into canister 100 as follows. First, flange 130c of locking lever 130 is momentarily lifted to permit control bracket 118 to be slid on guide rails 122 sufficiently to the left (as seen in FIG. 8) so as to leave ample space for the set of strips 10 to be inserted between buck plate 110 (FIG. 9) and wall 105. Then, with the canister 100 held generally vertical as shown in FIGS. 8 and 9, the set of strips are inserted in the space provided so that one corner of the set of strips abuts against walls 103 and 105, while the bottom edges of the strips 10 rest on bottom plate 107. Next, with flange 130c in its normal position so that ratchet 130a and tooth 140a are engaged, control bracket 118 is moved (under finger pressure) to the right as seen in FIG. 8, until the buck plate 110 (FIG. 9) abuts against the set of strips 10. Movement of the control bracket 118 to the right then continues (still under finger pressure) so as to compress springs 115 which in turn act on buck plate 110 to cause it to bear tightly on the set of strips 10. The resulting bias of the compressed springs 115 will then act on tooth 140a to cause it to lock firmly in engagement with the ratchet 130a in the rightmost notch thereof which is reached in moving the control bracket 118 to the right under finger pressure. The set of strips 10 will then be locked in the canister 100, as shown in FIGS. 8 and 9.

It will be understood that considerable variations in thicknesses among sets of strips can be tolerated in the above-described canister 100, since ratchet 130a provides a plurality of spaced notches which are available for locking engagement with tooth 140a, the springs 115 coupled between control bracket 118 and buck plate 110 serving to provide adequate bearing pressure on the set of strips 10 regardless of the particular notch in which tooth 140a locks. It will also be understood that removal of a set of strips 10 from the canister 100 may be accomplished simply by lifting up flange 130c of locking lever 130 to unlock tooth 140a from ratchet 130a, thereby permitting control bracket 118 to be slid to the left in FIG. 8 to free the set of strips 10 for removal from the canister 100.

The only portions of the canister 100 which have not yet been considered are the upwardly extending hooks 150 (FIGS. 8 and 9) affixed by screws 155a to a rectangular block 155 integral with the top portion of wall 103, and a lower step 160 (FIGS. 8 and 9) also integral with wall 103 and extending perpendicularly therefrom slightly below the lower end of wall 103. The distance that the portion 160b of step 160 extends perpendicularly from wall 103 is chosen along with the perpendicular extending distances of ridges 103b and block 155 so that the canister 100 may be firmly rested in a horizontal position on these portions, such as may be desired for storage purposes. The portion 160a of step 160 which extends below the lower end of wall 103 and the hooks 150 which extend above the upper end of wall 103 are important in facilitating insertion and removal of a set of data-storage strips 10 from the basic random access device shown in FIG. 2, as will be described hereinafter.

Now that a preferred embodiment of the canister 100 has been described in connection with FIGS. 8–11, it will next be explained how the canister 100 cooperates with the basic random access device previously described in connection with FIGS. 1–7 so as to permit convenient insertion, removal and/or replacement of a set of data-storage strips.

Referring to FIG. 12, the basic random access device of FIG. 2 is illustrated as it might appear when enclosed in a suitable cabinet 200, the upper portion of the guide means 80 of FIG. 2 being shown dashed in FIG. 12 in order to indicate the general positioning of the FIG. 2 device in the cabinet 200. The magazine 20 of FIG. 2 is also indicated in FIG. 12 and will be seen to contain a set of data-storage strips 10 which are visible through an opening 201 in the cabinet 200 and a window 202 of an access door 205 provided to permit access to the magazine 20, the height of the door 205 being approximately equal to the length of a data-storage strip. The door 205 is rigidly affixed to the loading means 50 (FIGS. 2 and 12) at right angles thereto, and upon suitable actuation of a release latch 206 provided in the back end of the loading means 50, the door 205 can be swung open to expose the strips 10, while the loading means 50 swings from its normal position adjacent the selecting and releasing means 30 (FIG. 2) into the opening 208 provided in cabinet 200. A tubular cylinder 212 also shown in FIG. 12 is slidable on fixed rod 213 and is adapted to cooperate with hooks 150 of the canister 100 (FIGS. 8 and 9) to aid in the insertion or removal of a set of data-storage strips 10, as will hereinafter be described.

FIG. 13 is a partial view of the portion of the cabinet 200 of FIG. 12 in the immediate vicinity of the magazine 20, except that the door 205 in FIG. 13 is shown open to a position almost perpendicular to cabinet 200, so that the loading means 50 to which the door 205 is rigidly affixed will have been swung into opening 208; the rotation of the door 205 and the loading means 50 (which rotate together) is about the hinges 50a provided between the left edge of the loading means 50 (as seen in FIG. 13) and a housing 210 forming the back side of the magazine 20.

It is to be noted that the magazine 20 in FIG. 13 is shown empty, that is, no data-storage strips are disposed therein. This is done in order to permit the selector and suspender rods generally indicated by the numeral 30 to be visible. These selector and suspender rods were considered earlier in connection with FIGS. 3–6 and it will be remembered that it is these rods which engage the notches 10i (FIG. 1) of a set of data-storage strips 10, and control the release and selection thereof. When the door 205 is closed, such as is the case in FIG. 12, the loading means 50, and particularly its loading plate 50b (which is shaped generally similar to a strip 10), will be in close proximity to the selection and suspender rods 30, with the notches 50i of the loading plate 50b in alignment therewith; the notches 50i are identical to the notches 10i of a strip, except that all retainer ears 10e (FIG. 5) are omitted. It will be understood, therefore, that when a strip 10 is received by the loading means 50 from the guide means 80 (FIGS. 2 and 12), and comes to rest against loading plate 50b, its notches 10i will be aligned with notches 50i of the loading plate 50b, which are in turn in alignment with the selection rods. Thus, the strip may conveniently be returned to the magazine 20 merely by causing the loading plate 50b to be momentarily driven a short distance forward onto the selection rods, the data-storage strip 10 then being carried onto the rods 30 along therewith. It will be understood that the specific construction and arrangement of the loading means 50 for producing this operation may take various suitable forms, a typical form being disclosed in the aforementioned copending patent application Serial No. 12,032, filed March 1, 1960. Details of the loading means 50 will not be considered herein, since such details are not material to the present invention. It is sufficient for the present invention merely to understand that when the door 205 is closed, as in FIG. 12, the loading means 50 is in an appropriate position to receive a data-storage strip from guide means 80 (FIGS. 2 and 12) and to cause the received strip to be returned to the magazine 20 in proper engagement with the selector and suspender rods 30 as a result of the action of the loading plate 50b, as just described.

Reference is now directed to FIG. 14 along with FIGS. 12 and 13 for the purpose of describing how a set of data-storage strips 10 retained in a canister 100, such as shown in FIGS. 8 and 9 may be inserted into the empty magazine 20 illustrated in FIG. 13. Only the portions of the random access device concerned with this insertion operation are shown in FIG. 14 in order not to confuse the figure. Initially, it is to be noted from FIGS. 12–14 that when the door 205 is open to its full position (the door 205 is shown almost fully open in FIG. 13), the loading means 50 will be clear of the selector and suspender rods 30, leaving sufficient space between the door 205 and the rods 30 for insertion of the canister 100, as shown in FIG. 14. The specific manner in which the set of data-storage strips 10 retained in canister 100 are inserted onto the selector and suspender rods 30 is as follows.

First, the door of the cabinet 200 is opened wide and the tubular cylinder 212 (FIGS. 12–14) is slid over to the extreme right over opening 208 (FIGS. 12 and 13) in the cabinet 200. Then, with the canister 100 held at an angle of approximately 45° from the horizontal, as generally indicated by the broken lines in FIG. 14, the hooks 150 are placed on the reduced portion 212a of tubular cylinder 212, and the canister is pivoted about tubular cylinder 212 (as indicated by the arrow 250 in FIG. 14) until the portion 160a of step 160 on the canister 100 abuts against stop member 220 (FIGS. 13 and 14). The resultant position of the canister 100 will then be as shown in FIG. 14, with the selector rod notches 10i0–10i7 (FIGS. 6 and 14) aligned with their respective selector rods 30b0–30b7 (FIGS. 3 and 5) and the suspender rod notches 10m and 10n aligned with their respective suspender rods 30t and 30u. It will be understood, therefore, that the above-described cooperation between hooks 150 and portion 160a of canister 100, with tubular cylinder 212 and stop member 220, respectively, of the basic random access device, makes it possible to rapidly and conveniently bring the notches of the set of data-storage strips retained in the canister 100 into alignment with their respective selector and suspender rods.

Having positioned the canister 100 as shown in FIG. 14, the next stop in the operation is to move the canister to the left (as indicated by the arrow 260 in FIG. 14) while applying sufficient downward pressure so that the hooks 150 (and thus also the canister 100) will slide in unison with tubular cylinder 212, which in turn slides on rod 213. Since the notches of the set of data-storage strips 10 have been brought into alignment with respective ones of the selector and suspender rods 30, as described in the previous paragraph, movement of the canister 100 to the left (while still maintaining portion 160a of the canister 100 abutting against stop member 220) will thereby cause the notches of the set of data-storage strips to become engaged with their respective selector and suspender rods. Movement of the canister to the left (that is, in the direction of the arrow 260 in FIG. 14) is continued in this manner until all of the data-storage strips 10 retained in the canister 100 are suspended on the rods 30, which occurs when the canister 100 has been moved on tubular cylinder 212 approximately to the center of housing 210 (FIG. 13). The data-storage strips 10 are then released from the canister 100 as described previously—that is, by lifting flange 130c of locking member 130 (FIG. 8) of the canister 100, and then sliding control bracket 118 away from wall 105 so as to remove the buck plate 110 (FIG. 9) from against the set of strips 10. With the strips 10 thus free of the canister 100, the empty canister is then pivoted outward from the magazine 20 (opposite to arrow 250 in FIG. 14) and its hooks 150 lifted off of tubular cylinder 212, leaving the set of data-storage strips properly engaged with the rods 30 in the magazine 20. The door 205 is then closed again, thereby rotating the loading means 50 back into operative position adjacent the rods 30. The random access device is then ready to operate on the newly inserted set of data-storage strips 10.

It will be appreciated that the above-described operations required for inserting a set of data-storage strips into the magazine 20 of the random access device can be performed quite rapidly and, in fact, can quite easily be performed in less than thirty seconds. Removal of a set of data-storage strips can likewise be accomplished just as fast and involves a procedure which is essentially the reverse of the previously described insertion procedure. More specifically, when it is desired to remove a set of data-storage strips 10 from the magazine 20, the tubular cylinder 212 is first slid over to the left side of the magazine 20 (FIG. 13) if it is not already there. The data-storage strips in the magazine are then formed into a pack and held together with the fingers while the hooks of an empty canister 100 (with the control bracket 118 positioned to provide a sufficient opening between buck plate 110 and wall 105 to receive the set of strips) are fitted onto reduced portions 212a of tubular cylinder 212. The canister is then pivoted into the magazine 20 (in the direction of arrow 250 in FIG. 14) and the packed strips are placed so as to rest on bottom plate 107 between wall 105 and buck plate 110 (FIG. 9). The control bracket 118 is then moved by finger pressure (while maintaining the strips uniformly packed) until the strips are tightly and uniformly retained between buck plate 110 and wall 105, as shown in FIG. 9. As described previously, the tooth 140a of engaging member 140 (FIGS. 8 and 14) will lock in the last notch of ratchet 130a reached so as to firmly retain the set of strips in the canister. The strip-filled canister 100 is then slid on tubular cylinder 212 to the right (opposite to arrow 260 in FIG. 14) until the data-storage strips slide off the selection rods 30b, so as to return the canister 100 to the position shown in FIG. 14. The canister is then pivoted out of the magazine again (opposite to arrow 250 in FIG. 14) and the hooks 150 lifted off of tubular cylinder 212, thereby completely removing the canister 100 and the set of strips retained therein from the random access device.

It is to be noted that in the initial description of the basic random access device in connection with FIGS. 1–7, it was mentioned that air streams are suitably applied during operation of the device to separate the strips in order to insure reliable release of a selected strip. It is preferable that these air streams be turned off during removal or insertion of a set of strips to prevent these air streams from interfering with the insertion or removal procedure. Once a set of strips has been inserted into the magazine 20, the air streams may be turned on again to separate the newly inserted strips.

While the foregoing disclosure has been concerned with certain illustrative embodiments, it is to be understood that the invention is susceptible of many modifications and variations in both construction and arrangement, as well as being subject to uses other than those described herein. The present invention, therefore, is not to be considered as limited to the specific disclosure provided herein, but is to be considered as including all modifications and variations coming within the scope of the invention as defined in the appended claims.

What is claimed is:

1. A canister for use in retaining and permitting rapid removal of a plurality of flexible generally rectangular data-storage strips each having coded notches at one edge thereof, comprising: a body portion having first and second generally rectangular walls at substantially right angles to one another and a bottom plate at substantially right angles to both of said first and second walls, the length of said walls being chosen so that when the bottom short edges of said strips are rested on said bottom plate the major portion of the lengths of said strips will be within said first and second walls with the coded notches of said strips extending thereabove, a control bracket slidably mounted to said second wall in the central vicinity thereof and accessible from the outside thereof for movement in a direction away from said first wall, a movable generally rectangular plate having approximately the same width and length as said first wall and disposed substantially parallel thereto, spring means coupling said control bracket to the side of said movable plate opposite from said first wall so that the position of said movable plate relative thereto is controllable in response to the action of said spring means on said movable plate as said control bracket is moved with respect to said second wall, releasable locking means including a spring biased ratchet affixed to the outside of said second wall adjacent said control bracket, a tooth affixed to said control bracket in cooperative relationship with said ratchet so as to permit a set of strips interposed between said first wall and said movable plate to be resiliently locked therebetween as a result of movement of said control bracket towards said first wall, and a releasing flange depending from said ratchet and disposed so as to permit removing said ratchet away from said tooth to unlock said control bracket for movement of said movable plate away from said first wall whereby to release a set of strips interposed therebetween, a pair of spaced curved hooks affixed to the upper portion of said second wall and extending thereabove beyond the coded notches of a set of strips when held in said canister, said hooks being located so that a line drawn between the inner curved surfaces of said hooks is located substantially parallel to said bottom plate and substantially perpendicular to said first wall and spaced from the outside of said second wall with the inner curved portion of said hooks facing toward said second wall, and a step member depending from the bottom of said second wall and having an aligning surface extending below and parallel to said second wall.

2. The invention in accordance with claim 1, wherein said control member includes a connecting portion extending perpendicularly from said second wall through a slot provided therein into the area between said first and second walls so that said connecting portion is parallel to said movable plate and adjacent the side thereof opposite from said first wall, and wherein said spring means comprises two spaced studs affixed in respective aligned holes in said movable plate and said connecting portion of said control member, and a spring encircling each stud between said movable plate and said connecting portion of said control member.

References Cited by the Examiner

UNITED STATES PATENTS

| 382,875 | 5/1888 | Hoffman | 129—26 X |
|---|---|---|---|
| 809,976 | 1/1906 | Ober | 129—28 X |
| 1,037,788 | 9/1912 | Maupin | 129—28 |
| 2,115,389 | 4/1938 | Jones et al. | 129—28 |
| 2,160,267 | 5/1939 | Griswold | 129—28 |
| 2,683,458 | 7/1954 | Davis et al. | 129—16.1 |
| 2,811,709 | 10/1957 | Haselton et al. | 340—174.1 |
| 2,910,669 | 10/1959 | Brand | 340—174.1 |
| 2,967,079 | 1/1961 | Parvis | 312—184 |
| 2,976,097 | 3/1961 | Devine | 312—184 |
| 3,092,114 | 6/1963 | Jonker | 129—16.1 |

FOREIGN PATENTS 693,908  7/1953  Great Britain.

JEROME SCHNALL, *Primary Examiner.*

DANIEL E. SRAGOW, *Examiner.*

MICHAEL K. KIRK, *Assistant Examiner.*